(12) United States Patent
Oota et al.

(10) Patent No.: US 10,056,585 B2
(45) Date of Patent: Aug. 21, 2018

(54) BATTERY HOLDER

(71) Applicant: Yokogawa Electric Corporation, Musashino-shi, Tokyo (JP)

(72) Inventors: Yasunori Oota, Musashino (JP); Youichi Igarashi, Musashino (JP); Takuya Nidaira, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 15/027,024

(22) PCT Filed: Sep. 22, 2014

(86) PCT No.: PCT/JP2014/075063
§ 371 (c)(1),
(2) Date: Apr. 4, 2016

(87) PCT Pub. No.: WO2015/053069
PCT Pub. Date: Apr. 16, 2015

(65) Prior Publication Data
US 2016/0240826 A1    Aug. 18, 2016

(30) Foreign Application Priority Data

Oct. 11, 2013  (JP) ................ 2013-213806

(51) Int. Cl.
*H01M 2/10* (2006.01)
*H01M 2/34* (2006.01)

(52) U.S. Cl.
CPC .......... *H01M 2/1055* (2013.01); *H01M 2/34* (2013.01)

(58) Field of Classification Search
CPC .................. H01M 2/1055; H01M 2/34
See application file for complete search history.

(56) References Cited

U.S. PATENT DOCUMENTS

| 3,662,166 A | 5/1972 | Dietz | |
|---|---|---|---|
| 4,265,984 A * | 5/1981 | Kaye | ............. H01M 2/105 429/151 |

(Continued)

FOREIGN PATENT DOCUMENTS

| JP | S 33-8838 Y1 | 6/1958 |
|---|---|---|
| JP | H 2-124660 U | 10/1990 |

(Continued)

OTHER PUBLICATIONS

Translation of JPH0997599.*

(Continued)

*Primary Examiner* — Sarah A. Slifka
*Assistant Examiner* — Brian R Ohara
(74) *Attorney, Agent, or Firm* — Sughrue Mion, PLLC

(57) ABSTRACT

The purpose of the present invention is to realize a battery holder, which can suppress occurrence of an instantaneous interruption in outputting direct-current power to the outside due to continuous strong external vibrations or impacts and have good attachability and detachability of battery. The battery holder includes electrode contact portions 13 (14) configured to be electrically connected to a battery BAT to be housed therein, wherein the electrode contact portions include a metal plate 132 (142) attached to a base 131 (141) having elasticity.

10 Claims, 3 Drawing Sheets

(56) References Cited

U.S. PATENT DOCUMENTS

| | | | | |
|---|---|---|---|---|
| 4,595,641 | A * | 6/1986 | Giurtino | H01M 2/342 429/1 |
| 5,007,859 | A * | 4/1991 | Sangregory | H01M 2/1055 439/500 |
| 5,211,579 | A | 5/1993 | Seong et al. | |
| 5,431,575 | A * | 7/1995 | Engira | H01M 2/1055 429/100 |
| 6,365,297 | B1 * | 4/2002 | Wolczak | H01M 2/1083 429/151 |
| 2008/0268296 | A1 * | 10/2008 | Larsen | H01M 2/202 429/1 |
| 2009/0023055 | A1 * | 1/2009 | Gastineau | H01M 2/105 429/99 |
| 2009/0233163 | A1 * | 9/2009 | Fang | H01M 2/1022 429/99 |
| 2010/0304188 | A1 * | 12/2010 | Larsen | H01M 2/105 429/1 |
| 2013/0236769 | A1 * | 9/2013 | Bang | H01M 2/105 429/159 |
| 2013/0295429 | A1 | 11/2013 | Makie | |

FOREIGN PATENT DOCUMENTS

| | | | | |
|---|---|---|---|---|
| JP | H0997599 | * | 4/1997 | H01M 2/10 |
| JP | H 11-135095 | A | 5/1999 | |
| WO | 2012101557 | A1 | 8/2012 | |

OTHER PUBLICATIONS

Definitions (Year: 2017).*

Search Report (PCT/ISA/210)dated Nov. 11, 2014, issued by the International Searching Authority in counterpart International Application No. PCT/JP2014/075063.

Written Opinion (PCT/ISA/237)dated Nov. 11, 2014, issued by the International Searching Authority in counterpart International Application No. PCT/JP2014/075063.

Communication dated Mar. 8, 2017, from the European Patent Office in counterpart European Application No. 14851961.4.

* cited by examiner

BATTERY HOLDER

TECHNICAL FIELD

The present invention relates to a battery holder, and in particular to an electrode structure thereof.

BACKGROUND ART

FIG. 4 is a configuration explanatory view showing an example of a battery holder which has been conventionally used, in which the battery holder has a leaf spring-type electrode structure. In FIG. 4, a base plate 1 is formed in a rectangular shape having a long side with a length nearly equal to that of a battery BAT to be held thereon, and a positive electrode contact portion 2 made of a leaf spring is fixed on one end thereof in a longitudinal axial direction and a negative electrode contact portion 3 made of a leaf spring is fixed on the other end to oppose the positive electrode contact portion 2. Also, on both sides of the base plate 1, holding pieces 4 and 5 made of a leaf spring for holding the battery BAT to be attached thereon are fixed to oppose each other.

The positive electrode contact portion 2 and the negative electrode contact portion 3 have one end bent in an L-shape so that a bent side thereof is fixed on the base plate 1. The other end are bent in a mountain shape to serve as a contact portion, which can be pressed against and come in stable contact with each electrode of the battery BAT to be held thereon by an elastic force of the leaf springs.

Because the distal ends of the positive electrode contact portion 2 and the negative electrode contact portion 3 are bent in such a mountain shape, a distance therebetween is slightly wider than an axial length of the battery BAT to be fixed and held on the base plate 1, thereby allow the battery BAT to be easily inserted therebetween. Meanwhile, the positive electrode contact portion 2 and the negative electrode contact portion 3 are electrically insulated from each other via the base plate 1.

The holding pieces 4 and 5 are also made of a leaf spring, and middle parts thereof are fixed on the base plate 1 to be perpendicular to a longitudinal axial direction of the base plate 1. Both ends of the holding pieces 4 and 5 are bent in a substantially L-shape in the same direction to be pressed against side surfaces of the battery BAT to be attached by an elastic force of the leaf springs, and also are formed in a circular arc shape to sandwich the battery BAT on opposing sides thereof in a substantially close contact state. Also, distal end portions of the holding pieces 4 and 5 are bent outward away from each other to allow the battery BAT to be easily attached and detached.

FIG. 5 is a configuration explanatory view showing another example of a battery holder which has been conventionally used, in which the battery holder has a coil spring-type electrode structure. In FIG. 5, a case 6 is provided with partition walls 6a and 6b to define two battery housing portions 6c and 6d, thereby allowing two batteries BATs to be mounted therein. On a side of each of the battery housing portions 6c and 6d which opposes the partition walls 6a and 6b, hold portions 6e and 6f of a circular arc-shaped cross section are formed to hold the respective batteries BATs received therein by partially coming in close contact with a side surface thereof.

A positive electrode contact portion 7 made of a coil spring is fixed on one of wall surfaces of the battery housing portion 6c opposing each other along an axial direction thereof, and a negative electrode contact portion 8 made of a coil spring is fixed on the other wall surface. Similarly, a positive electrode contact portion 9 made of a coil spring is fixed on one of wall surfaces of the battery housing portion 6d opposing each other along an axial direction thereof, and a negative electrode contact portion 10 made of a coil spring is fixed on the other wall surface.

Meanwhile, the electrode contact portions 7 to 10 are insulated against the case 6. Also, the negative electrode contact portion 7 and the positive electrode contact portion 10 are electrically connected to each other so that two batteries BATs mounted in the battery housing portions 6c and 6d are connected in series to each other.

In the configuration of FIG. 5, for example, when the battery BAT is mounted and housed in the battery housing portion 6c, the battery BAT is tilted so that any one of contact coils 7 and 8 is pressed by one end of the battery BAT, and then is pushed therein until the other end of the battery BAT comes in stable contact with the other contact coil.

FIG. 6 is a configuration explanatory view of a battery holder as described in Patent Document 1. In FIG. 6, a positive electrode contact portion 21 is made of a leaf spring and a negative electrode contact portion 22 is made of a coil spring.

CITATION LIST

Patent Document

Patent Document 1: Japanese Patent Application Publication No. H11-135095

SUMMARY OF INVENTION

Technical Problem

In the left spring-type electrode structure shown in FIG. 4, attachability and detachability of the battery are good and also the structure is simple, but there is a possibility that an instantaneous interruption in outputting direct-current power is occurred due to mechanical vibrations.

Focusing on contact states between each electrode of the battery BAT and the positive electrode contact portion 2 and negative electrode contact portion 3, leaf springs for the positive electrode contact portion 2 and the negative electrode contact portion 3 have flexibility and thus can follow movement of the battery BAT along the longitudinal axial direction. However, the leaf springs are not deformed following movements along directions other than the longitudinal axial direction, thereby causing a slip between each electrode of the battery BAT and the positive electrode contact portion 2 and negative electrode contact portion 3.

The holding pieces 4 and 5 are intended to primarily perform a function of retaining a position of the battery BAT in a direction perpendicular to the longitudinal axial direction. The holding pieces 4 and 5 also have a certain effect of suppressing an influence of vibrations on the battery BAT in the longitudinal axial direction, but in order to enhance a suppressing force against stronger vibrations, it is necessary to enhance a position retaining force by causing the leaf springs to have an increased elastic force.

However, if the position retaining force of the holding pieces 4 and 5 is increased, attachability and detachability of the battery BAT become poor, and thus such measures are not sufficient.

Occurrence of a slip at each electrode of the battery BAT does not immediately cause an instantaneous interruption in outputting direct-current power, but if strong vibrations are continuously occurred, an insulating abrasion powder is created due to metallic abrasion of the contact portions, thereby causing a poor insulation. This phenomenon has been reported as a fine sliding abrasion.

Contrarily, the coil spring-type electrode structure shown in FIG. 5 has a certain effect on vibrations. If a compressed state of the coil springs is a stretchable state, the coil springs can be deformed in all directions within a range of elastic deformation of the springs, even when an external force is exerted on distal ends of the coil springs. The distal ends of the coil springs 7 to 10 serving as contacts are pressed against and in contact with the respective electrodes of the batteries BATs by compressed forces of the coil springs 7 to 10.

If the batteries BAT are moved along the longitudinal axial direction due to vibrations, the coil springs 7 to 10 are displaced following the movement due to elastic deformation thereof, and if the movement is within a certain range in the longitudinal axial direction, the batteries BATs are also displaced following the movement due to frictional forces of the contact portions.

In order to displace the coil springs 7 to 10 serving as contacts to follow vibrations of the batteries BAT in the longitudinal axial direction, spring constants and lengths thereof have to be set to values, at which when the batteries BATs are moved toward one end side thereof in the longitudinal axial direction, the distal ends of the coils springs located on the other end side are prevented from being separated and instantaneously interrupted from the respective electrodes of the batteries BATs.

However, in order to enhance attachability and detachability of the battery BAT, a length of the coil spring located on one side thereof has to be longer than that on the other side, and then the battery BAT has to be mounted in a tilted state so that a pressed amount of the coil spring on the other side is small. In this case, there is a possibility that an instantaneous interruption is occurred due to strong vibrations.

In the conventional example of FIG. 6, there is likewise a possibility that an instantaneous interruption is occurred due to strong vibrations due to the same reasons as those in the conventional example of FIG. 5.

The present invention is directed to solve the problems as described above and an object thereof is to realize a battery holder, which can suppress occurrence of an instantaneous interruption in outputting direct-current power to the outside due to continuous strong external vibrations or impacts and have good attachability and detachability of a battery.

Solution to Problem

The object of the present invention is achieved by the following configurations.

(1) A battery holder including electrode contact portions configured to be electrically connected with electrodes of a battery to be housed therein,
wherein the electrode contact portions includes a metal plate attached to a base having elasticity.

(2) The battery holder according to the above (1), wherein a part of the base around the metal plate of the electrode contact portions is formed to come in contact with a part of the battery around the electrodes.

(3) The battery holder according to the above (2), wherein the metal plate of a negative side of the electrode contact portions is partially cut out to prevent a positive electrode of the battery from coming in electrical contact therewith.

Advantageous Effects of Invention

According to the configurations, a battery holder can be realized, which can suppress occurrence of an instantaneous interruption in outputting direct-current power to the outside due to continuous strong external vibrations or impacts and have good attachability and detachability of a battery are good.

DESCRIPTION OF EMBODIMENTS

Figure 1:
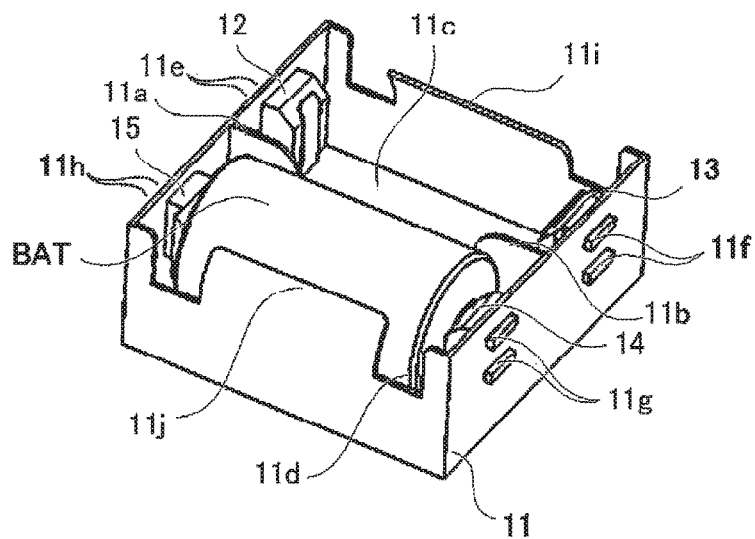
FIG. 1 is a configuration explanatory view showing an embodiment of the present invention.

Embodiments of the present invention will be now described in detail with reference to the accompanying drawings. FIG. 1 is a configuration explanatory view showing an embodiment of the present invention. In FIG. 1, a case 11 is provided with partition walls 11a and 11b to define two battery housing portions 11c and 11d allowing two batteries BATs to be mounted therein. Rectangular attaching holes 11e to 11h are respectively provided on wall surfaces of each of the battery housing portions 11c and 11d, which oppose each other along a longitudinal direction thereof. On a side of each of the battery housing portions 11c and 11d which opposes the partition walls 11a and 11b, hold portions 11i and 11j of a circular arc-shaped cross section are formed to hold the respective batteries BATs received therein by partially coming in close contact with a side surface thereof.

A positive electrode contact portion 12 is attached through the attaching holes 11e provided in one of the wall surfaces of the battery housing 11c opposing each other along the longitudinal direction, and a negative electrode contact portion 13 is attached through the attaching holes 11f provided in the other wall surface. Similarly, a positive electrode contact portion 14 is attached through the attaching holes 11g provided in one of the wall surfaces of the battery housing portion 11d opposing each other along an axial direction thereof, and a negative electrode contact portion 15 is attached through the attaching holes 11h provided in the other wall surface. Herein, the positive electrode contact portion 12 and the positive electrode contact portion 14 have the same structure, and the negative electrode contact portion 13 and the negative electrode contact portion 15 also have the same structure.

Meanwhile, the electrode contact portions 12 to 15 are insulated against the case 11. Also, the negative electrode contact portion 13 and the positive electrode contact portion 14 are electrically connected to each other so that two batteries BATs mounted in the battery housing portions 11c and 11d are connected in series to each other.

Figure 2A:
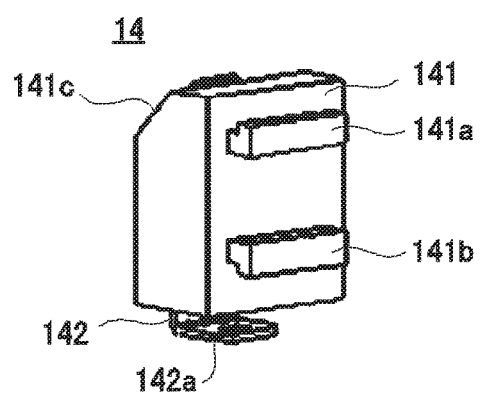
FIGS. 2A and 2B are configuration explanatory views showing a specific example of a positive electrode contact portion 14.
Figure 2B:
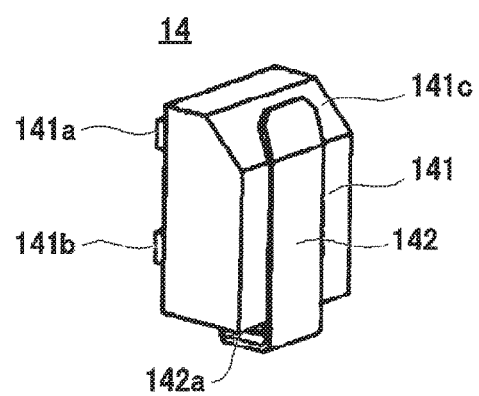

FIGS. 2A and 2B are configuration explanatory views showing a specific example of the positive electrode contact portion 14, in which FIG. 2A shows a back surface and FIG. 2B shows a front surface. In FIGS. 2A and 2B, the positive electrode contact portion 14 is constituted of a base 141, which is made of an elastic insulator, such as rubber, and is shaped in a rectangular parallelepiped shape, and a metal plate 142, which is electrically conductive and is bent in a predetermined shape to be fixed to the base 141, for example, by means of an adhesive.

A back surface of the base 141 is provided with two hooks 141a and 141b configured to be fitted and locked in the attaching holes 11g, which are provided in the one wall surface of the battery housing portion 11d, and thus serves as an attaching surface to the case 11. Meanwhile, the two hooks 141a and 141b are shaped in an L-shaped cross section so that free sides thereof are oriented away from each other.

A ridge portion between a front surface and an upper surface of the base 141 is obliquely cut to form an inclined portion 141c allowing insertion of the battery BAT to be facilitated. Thus, the front surface of the base 141 serves as a support surface for supporting the battery BAT to be mounted in the battery housing portion 11d.

One end of the metal plate 142 is bent at an angle corresponding to an inclination angle of the inclined portion 141c to come in close contact with the support surface of the base 141 and also to extend substantially along the inclined portion 141c, and the other end thereof is bent in a L-shape to protrude from the bottom surface of the case 11 in a state where the base 141 is fitted and locked in the attaching holes 11g of the case 11. On a bent side of the L-shape, a wiring hole 142a is provided to allow a wiring material, not shown, to be bonded thereto by soldering.

Figure 3A:
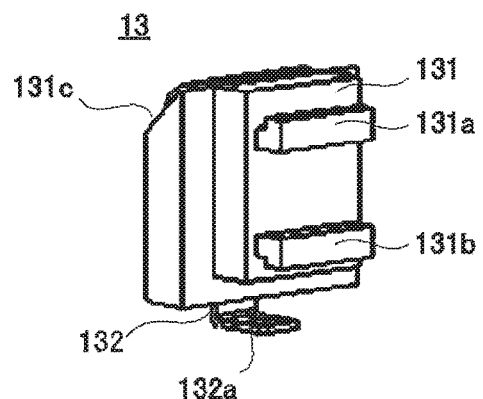
FIGS. 3A and 3B are configuration explanatory views showing a specific example of a negative electrode contact portion 13.
Figure 3B:
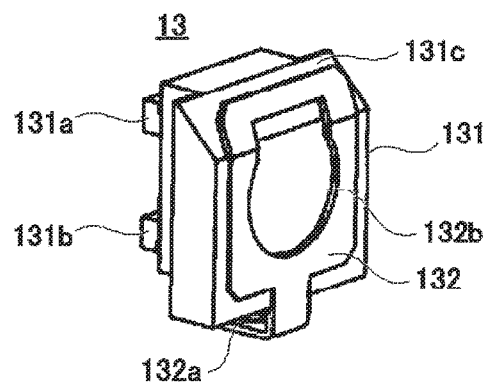
Figure 4:
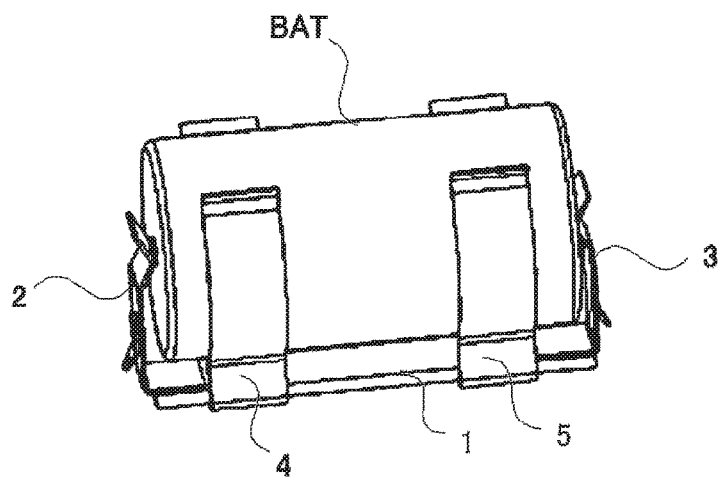
FIG. 4 is a configuration explanatory view showing an example of a battery holder which has been conventionally used.
Figure 5:
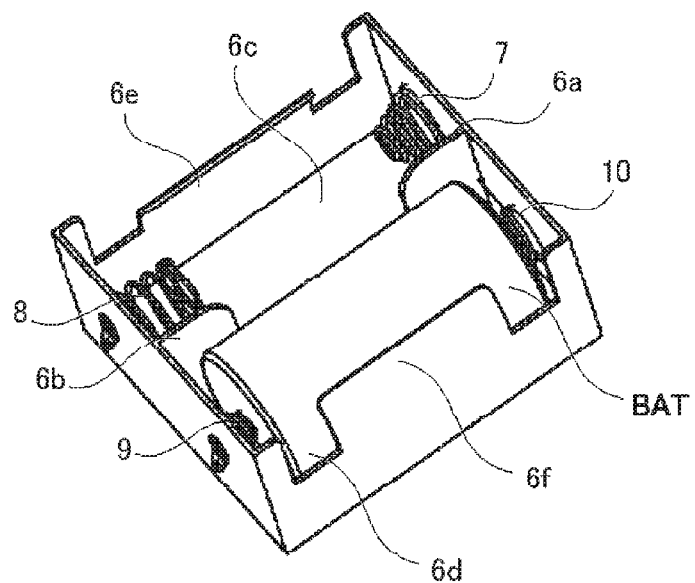
FIG. 5 is a configuration explanatory view showing another example of a battery holder which has been conventionally used.
Figure 6:
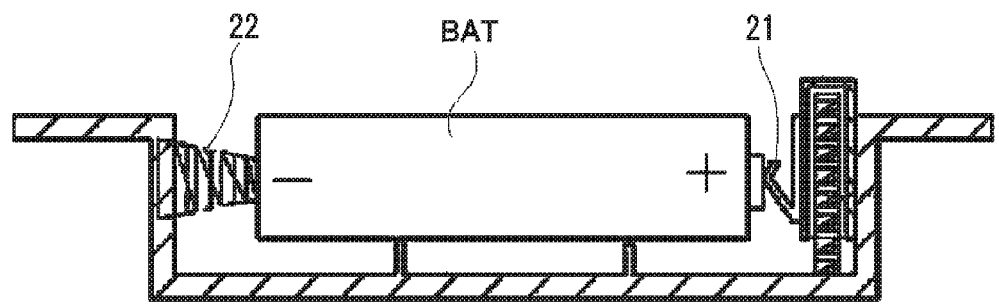
FIG. 6 is a configuration explanatory view of a battery holder as described in Patent Document 1.

FIGS. 3A and 3B are configuration explanatory views showing a specific example of the negative electrode contact portion 13, in which FIG. 3A shows a back surface and FIG. 3B shows a front surface. In FIGS. 3A and 3B, the negative electrode contact portion 13 is constituted of a base 131, which is made of an elastic insulator, such as rubber, and is shaped in a rectangular parallelepiped shape, and a metal plate 132, which is electrically conductive and is bent in a predetermined shape to be fixed to the base 131, for example, by means of an adhesive.

A back surface of the base 131 is provided with two hooks 131a and 131b configured to be fitted and locked in the attaching holes 11f, which are provided in the one wall surface of the battery housing portion 11c, and thus serves as an attaching surface to the case 11. Meanwhile, the two hooks 131a and 131b are shaped in an L-shaped cross section so that free sides thereof are oriented away from each other.

A ridge portion between a front surface and an upper surface of the base 131 is obliquely cut to form an inclined portion 131c allowing insertion of the battery BAT to be facilitated. Thus, the front surface of the base 131 serves as a support surface for supporting the battery BAT to be mounted in the battery housing portion 11c.

One end of the metal plate 132 is bent at an angle corresponding to an inclination angle of the inclined portion 131c to come in close contact with the support surface of the base 131 and also to extend substantially along the inclined portion 131c, and the other end thereof is bent in a L-shape to protrude from the bottom surface of the case 11 in a state where the base 131 is fitted and locked in the attaching holes 11f of the case 11. On a bent side of the L-shape, a wiring hole 132a is provided to allow a wiring material, not shown, to be bonded thereto by soldering.

In addition, a punched hole 132b is provided in a middle part of a face of the metal plate 132, which opposes the base 131 over a range from the support surface thereof to the inclined surface 131c. The punched hole 132b serves as a safety mechanism for preventing the positive electrode of the battery BAT from coming in contact with the metal plate 132 when the positive and negative electrodes of the battery BAT are wrongly inserted, and also serves as a holding mechanism for holding the negative electrode of the battery BAT in a close contact state by allowing a part of the support surface of the base 131 having elasticity to relatively bulge out through the punched hole 132b as the metal plate 132 is pressed against the support surface in a state where the battery BAT is correctly mounted.

According to the configurations as described above, mounting of the batteries BATs in the battery housing portions 11c and 11d is performed by a simple operation, in which the batteries BATs are approximately positioned so that orientations of the positive and negative electrodes thereof are aligned with positive and negative electrode contact portions of the battery housing portions 11c and 11d and then the positive and negative electrodes of the batteries BATs are pressed in a nearly horizontal state from the top of the battery housing portions 11c and 11d toward the positive and negative electrode contact portions of the battery housing portions 11c and 11d.

Similarly, when the batteries BATs are detached from the battery housing portions 11c and 11d, a simply operation in which the batteries BATs are only pulled upward may be performed. Accordingly, attachability and detachability of the batteries BATs corresponding to those in a conventional leaf spring-type electrode structure can be realized by such simple operations.

In the state where the batteries BATs have been mounted in the battery housing portions 11c and 11d, if the elastic base of each electrode contact portion is permitted to be expanded from a compressed state, the base can be deformed in all directions within a range of elastic deformation thereof. Accordingly, even if the batteries BATs are moved due to vibrations, the batteries BATs follow elastic deformation of the base in the longitudinal axial direction thereof.

In a direction perpendicular to the longitudinal axial direction of the batteries BATs, the contact portions follow movement of the batteries BAT due to frictional forces thereof if the movement is within a certain range.

Also, because the front surface of the base is in contact with a surface of each electrode of the batteries BATs, the frictional forces when following movement of the batteries BATs in a direction perpendicular to the longitudinal axial direction can be increased. Therefore, an electrode structure can be obtained, which has the same ability of following vibrations as those of the conventional coil-spring type electrode structure and hardly causes an instantaneous interruption due to a slip between opposing electrodes even if continuous strong external vibrations or impacts are exerted.

Meanwhile, although an example where rubber made of an insulator and having elasticity is used as the base has been described in the foregoing embodiments, the present invention is not limited to rubber, but may employ elastomer or gel.

Also, the base may be composed of, for example, a conductive rubber and a desired part thereof may be electrically insulated by an insulating member.

As described above, according to the present invention, a battery holder can be realized, which can suppress occurrence of an instantaneous interruption in outputting direct-current power to the outside due to continuous strong external vibrations or impacts and have good attachability and detachability of a battery.

Meanwhile, in the foregoing description, specific preferable embodiments are just described for the purpose of explaining and illustrating the present invention. Accordingly, the present invention is not limited to the foregoing embodiments, but is intended to encompass various changes and modifications thereof without departing from the spirit thereof. This application is based on Japanese Patent Application No. 2013-213806 filed on Oct. 11, 2013, the entire contents of which are incorporated herein by reference. Also, all references cited herein are incorporated in their entireties.

REFERENCE NUMERALS LIST

11 Case
12, 14 Positive electrode contact portion
13, 15 Negative electrode contact portion
BAT Battery

The invention claimed is:

1. A battery holder comprising electrode contact portions configured to be electrically connected with electrodes of a battery to be housed therein,
   wherein each of the electrode contact portions comprises:
   a base which is made of an elastic insulator having elasticity; and
   a metal plate attached to one surface of the base,
   wherein a part of each base around the metal plate of the electrode contact portions is formed to come in contact with a part of the battery around the electrodes of the battery,
   wherein each metal plate is formed to come in contact with an electrode of the battery, and
   wherein another surface of each base serves as an attaching surface to a wall surface of the battery holder and is attached to a wall surface of the battery holder, the wall surfaces attached to each base being opposed to each other.

2. The battery holder according to claim 1, wherein the metal plate of a negative side of the electrode contact portions is partially cut out to prevent a positive electrode of the battery from coming in electrical contact therewith.

3. The battery holder according to claim 1, wherein each of the bases is shaped into a pentagonal prism and comprises an upper surface inclined portion.

4. The battery holder according to claim 1, wherein the elastic insulator is a rubber.

5. A battery holder comprising:
   electrode contact portions configured to be electrically connected with electrodes of a battery to be housed in the battery holder; and
   a case, wherein the electrode contact portions are attached to the case,
   wherein each electrode contact portion comprises:
   a base which is made of an elastic insulator having elasticity; and
   a metal plate attached to one surface of the base
   wherein a part of the base around the metal plate of the electrode contact portions is formed to come in contact with a part of the battery around the electrodes of the battery,
   wherein the metal plate of the electrode contact portions is formed to come in contact with an electrode of the battery, and
   wherein another surface of each base serves as an attaching surface to a wall surface of the case and is attached to a wall surface of the case, the wall surfaces attached to each base being opposed to each other.

6. The battery holder according to claim 5, wherein a punched hole is provided in one of the metal plates.

7. The battery holder according to claim 5, wherein each base is shaped into a pentagonal prism and comprises an upper surface inclined portion.

8. The battery holder according to claim 5, wherein each base comprises at least one hook, and the case comprises a plurality of attaching holes corresponding to the at least one hook.

9. The battery holder according to claim 1, wherein the battery follows elastic deformations of a base of an electrode contact portion in a longitudinal axial direction thereof.

10. The battery holder according to claim 5, wherein the battery housed within the battery holder follows elastic deformations of a base of an electrode contact portion in a longitudinal axial direction thereof.

* * * * *